United States Patent [19]
Danielian et al.

[11] Patent Number: 5,808,730
[45] Date of Patent: Sep. 15, 1998

[54] FIBER OPTIC DISPLACEMENT SENSOR

[75] Inventors: George Danielian; Alexej Avacian, both of Moscow, Russian Federation

[73] Assignee: CeramOptec Industries Inc., East Longmeadow, Mass.

[21] Appl. No.: 826,933

[22] Filed: Apr. 8, 1997

[51] Int. Cl.$^6$ .................................................. G01N 21/00
[52] U.S. Cl. .......................................................... 356/73.1
[58] Field of Search ............................................. 356/73.1

[56] References Cited

U.S. PATENT DOCUMENTS

| | | | |
|---|---|---|---|
| 4,651,327 | 3/1987 | Fujita | ........................................ 375/1 |
| 4,774,494 | 9/1988 | Extance et al. | . |
| 4,901,072 | 2/1990 | Fox | . |
| 5,453,838 | 9/1995 | Danielian e al. | . |

FOREIGN PATENT DOCUMENTS

| | | |
|---|---|---|
| 206656B1 | 12/1993 | European Pat. Off. . |
| 2185359 | 7/1987 | United Kingdom . |

*Primary Examiner*—Frank G. Font
*Assistant Examiner*—Reginald A. Ratliff
*Attorney, Agent, or Firm*—Bolesh J. Skutnik

[57] ABSTRACT

A device is provided for measuring angular displacement and rotational movement of a shaft or linear displacement of an object comprising a light source, a Multichannel Fiber Optic Bundle, an optical code wheel or linear scale with optical tracks for light modulation, including typically a raster and a reference mark, a system of photodetectors, amplifiers, comparators of analog signals and a digital electronic block. The device forms a sequence of electric pulses whose number is proportional to displacement, a set of pulses indicating zero position of the disk, and also a logic signal indicating the direction of the displacement. A multichannel fiber optic bundle provides channels for the transmission and collection of light from the light source to the sensing site and back to the photodetectors and for light intensity monitoring of the source. Special randomization of the fibers at the sensing element end of the multichannel fiber optic bundle into two or more channels and modulating the collected light signals by a raster splits the collected light signal into at least two channels and introduces a phase difference of 90° between the split channels. The electronic components of the device are connected with the sensing element with a multichannel fiber optic cable or the directly by the multichannel fiber optic bundle, which removes them from the often harsh environments surrounding the sensing element. This provides an important advantage for many practical applications over the prior art.

9 Claims, 7 Drawing Sheets

⊗ CHANNEL 1  ⊖ CHANNEL 3
⊘ CHANNEL 2  ○ CHANNEL 4

○ CHANNEL 1    ◐ CHANNEL 3
◐ CHANNEL 2    ○ CHANNEL 4

FIBER OPTIC DISPLACEMENT SENSOR

BACKGROUND OF THE INVENTION

1. Field of the Invention

The present invention relates to optical, displacement measuring devices in particular to a fiber optical sensor of angular or linear displacements based on modulation of the light beam by these displacements. In this type of device the modulated optical signal is transformed into electrical pulsed signals in such a way that the number of electrical pulses is proportional to the detected displacement. A fully fiber optical sensor, however, collects and transmits information about displacement without conversion to electrical signals at the sensing element.

2. Information Disclosure Statement

The prior art optical sensors have numerous parts. Basically, these include light sources, such as light emitting diodes (LEDs), light detectors, such as photodiodes, lenses, a phase code plate for splitting the light beams and introducing a phase difference between them (see e.g. FIG. 1 of European patent EP 0 206 656 B1). Some of these components (LEDs and photodetectors) fluctuate greatly or even can not function in harsh environmental conditions. The prior-art sensors also have multiple, potential sources of errors. For example, a typical device has a code disk mounted on the sensor probe and illuminated by a light emitting diode or diodes (LED) or by lamp light detectors (usually photodiodes,). These sources fluctuate in intensity in response to environmental factors which can create major errors in the displacement measurements.

The fiber optic sensor according to this invention does not have electronic components inside the sensitive probe section, the probe section and the entire device are therefore simpler and more stable in harsh environmental conditions. In one preferred embodiment a Multichannel Fiber Optic Bundle (MFOB) can transmit optical signals to and from an electronic block over separating distances up to hundreds meters. By using fiber optic bundles for transmitting and receiving signals rather than placing electronic components inside sensor probe, greater accuracy can be achieved by using a single fiber optic bundle.

BRIEF SUMMARY OF THE INVENTION

It is an object of the present invention to provide a device for measuring displacements on a rotating disk or linear displacements on a linear scale by modulating an optical signal, transmitting the signal to and receiving it from a remote sensing site and converting the modulated optical signal into an electric signal which can be easily processed.

A major object of the invention is to spatially separate electronic components of the device as far away as possible from its sensing element, i.e. the sensitive probe because for many practical applications the sensing element must be in contact with harsh environmental conditions.

Another object of present invention is to provide a Multichannel Fiber Optic Bundle (MFOB) to transmit and receive a modulated optical signal from a remote sensing element, passing it to an electronic subsystem, where it can be easily converted into an electric signal.

Yet another object of the invention is to provide a special design for multichannel optical fiber bundles, namely MFOBs, which deliver light from a source to a code raster and after modulation to photodetectors without a loss in accuracy, and simultaneously transmit light from the same light source through a feedback channel of the MFOB to permit accurate light intensity monitoring of the source with time and environmental conditions.

A still further object of the invention is to describe the design of optoelectronic components of the sensor providing basic functions for preferred embodiments with simple signal processing, precision/accuracy abilities and making operation of the sensor independent of the harsh environmental conditions commonly found near the sensitive probe.

Briefly stated, the present invention provides a device for measuring angular displacement and rotational movement of a shaft or linear displacement of an object comprising a light source, a Multichannel Fiber Optic Bundle (MFOB), an optical code wheel or linear scale with optical tracks for light modulation, including typically a raster and a reference mark, a system of photodetectors, amplifiers, comparators of analog signals and a digital electronic block. The device forms a sequence of electric pulses whose number is proportional to displacement, a set of pulses indicating zero position of the disk, and also a logic signal indicating the direction of the displacement. One or more multichannel optical fiber bundles provide channels for the transmission and collection of light from the light source to the sensing site and back to the photodetectors and for light intensity monitoring of the source. Special randomization of the fibers at the sensing element end of the MFOB into two or more channels and modulating the collected light signals by a raster splits the collected light signal into at least two channels and introduces a phase difference of 90° between the split channels. The electronic components of the device are connected with the sensing element by a multichannel fiber optic cable or directly by the collection MFOB, which removes the electronics from the often harsh environments surrounding the sensing element. This provides an important advantage for many practical applications over the prior art.

The above, and other objects, features and advantages of the present invention will become apparent from the following description read in conjunction with the accompanying drawings, in which like reference numbers in different drawings denote like items.

BRIEF DESCRIPTION OF DRAWINGS

FIG. 2b shows a structure of a sensitive target surface of multichannel fiber optic bundle (MFOB) in accordance with the embodiment in FIG. 1a.

Figure 1A:
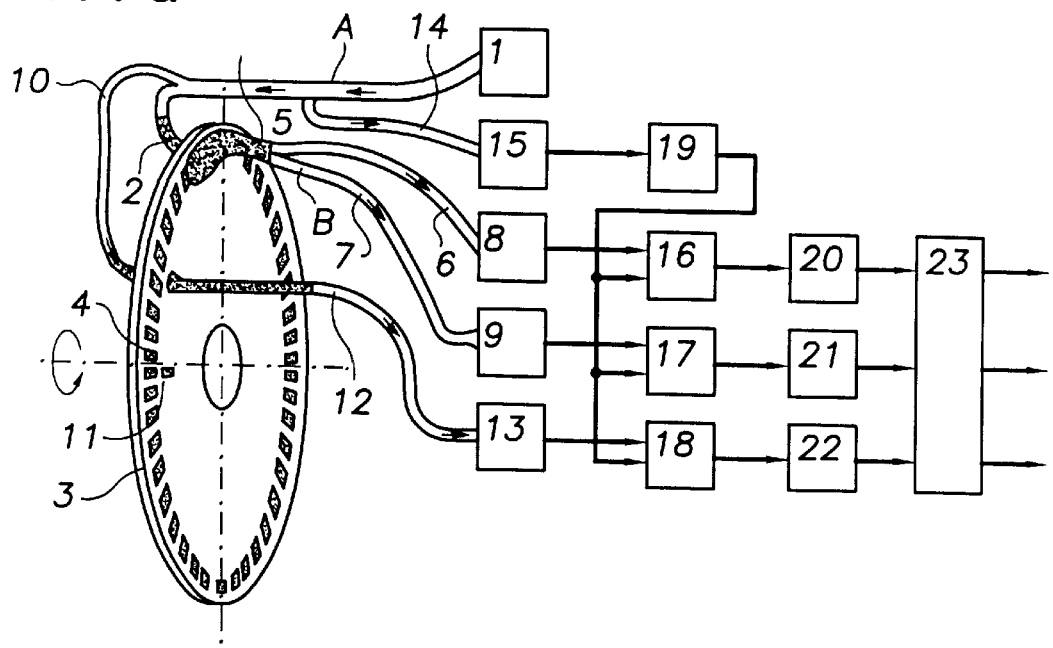
FIG. 1a shows basic elements of a fiber optic sensor constructed in accordance with a preferred embodiment of this invention, where a rotating disk with a coding mask is placed between a light source and a multichannel fiber bundle.
Figure 4:
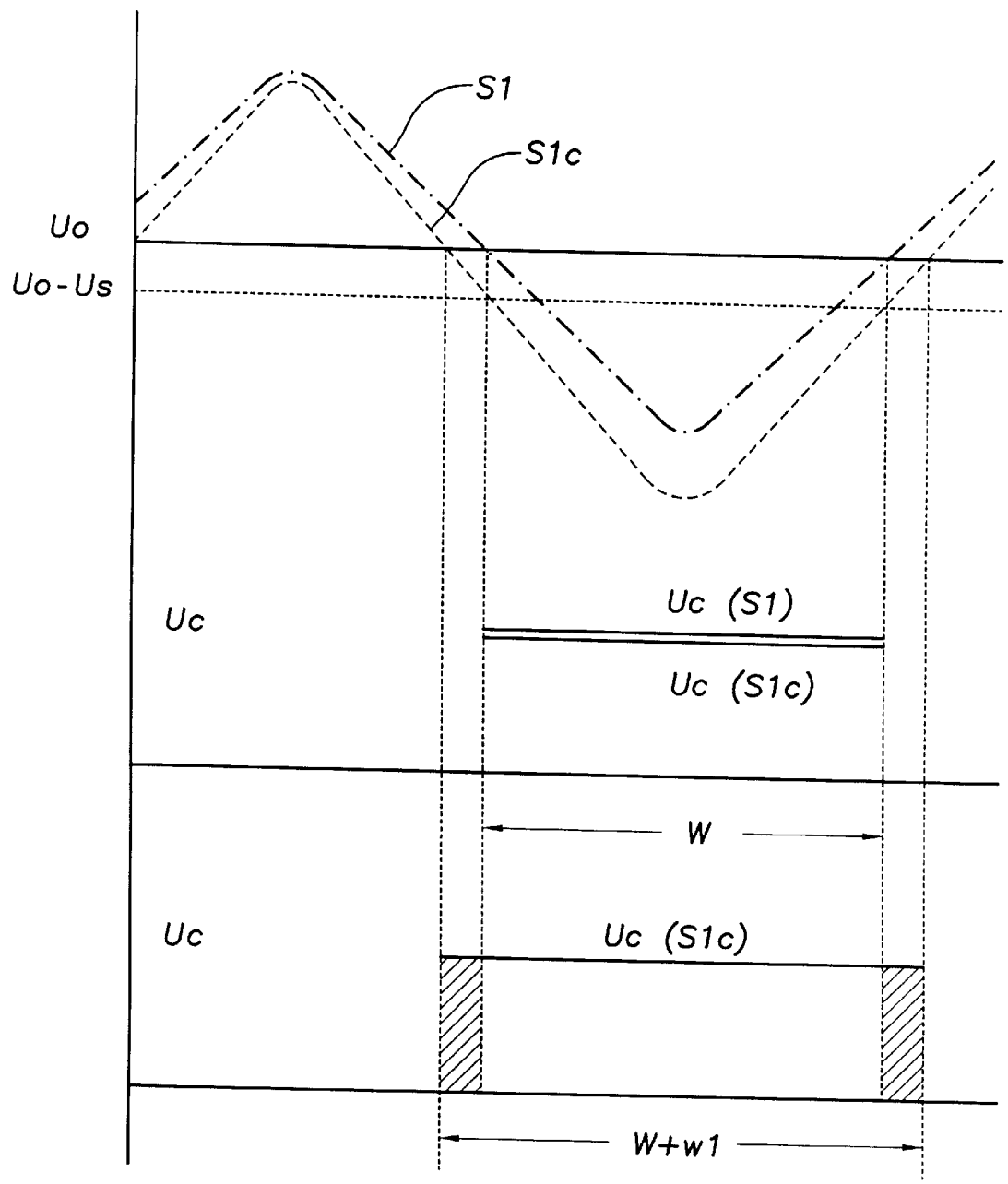

Line a—diagram of output signal from a differential amplifiers 16 of first light detector 8;

Line b—diagram of output signal from a differential amplifiers 17 of second light detector 9;

Line c—diagram of output signal form a differential amplifiers 18 of second light detector 10 placed near second optical track at the conditions/moment near zero—modulated section;

Line d—diagram from comparator 20 output;

Line e—diagram from a comparator 21 output;

Line f—diagram from a comparator 22 output;

Lines g, h, i—are diagrams from three logic outputs of digital logic block 23;

FIG. 4 shows diagrams illustrating operation of the system for correcting variations of light intensity.

DETAILED DESCRIPTION OF PREFERRED EMBODIMENTS

The present invention describes a fiber optic displacement sensor for indicating the angle displacement/rotational movement of a shaft or linear displacement of an object. It generally comprises at least one multichannel fiber optic bundle for light transmission, having transmitting and receiving channels and a reference fiber optic channel for light intensity variations correction, a target with a detecting raster and a reference raster. A full system would also include a light source illuminating the target, an array of photodetectors and a system for transformation of the signals from photodetectors into a sequence of electrical pulses. With this solution a displacement sensor can now be safely and accurately used in harsh environmental conditions such as: high temperature, high electromagnetic fields, radiation fields, or other conditions where electronic components (photodiodes, LEDs, electronic chips) can't be used.

Figure 2A:
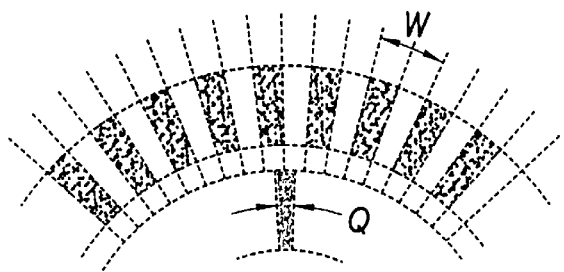
FIG. 2a. illustrates optical tracks form a segment of a rotating disk.
Figure 2B:
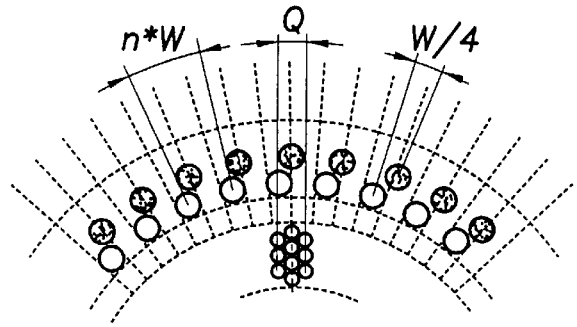

One preferred embodiment of the sensor is shown in FIG. 1a. The sensor system comprises a light source 1, and a lightguide delivering the light. Optical fiber bundle 10 delivers the light from source 1 to moving disk 3. Disk 3 has a raster formed by a sequence of periodically spaced transparent and non-transparent regions separated by step W, see FIG. 2a. Light, from branch 2 of fiber bundle 10, passing through transparent regions 4 of the raster is coupled into a light receiving optical fiber bundle 5. The fibers of bundle 5 are collected into two groups forming channels 6 and 7 delivering the light to photodetectors 8 and 9 respectively. Optical bundle 10 also delivers light from source 1 to reference transparent region 11 on disk 3 indicating a position of zero displacement. Width of this reference region Q should obey the following condition Q<W, as shown in FIG. 2a. The light passing through region 11 is collected by receiving optical fiber bundle 12 delivering the light to photodetector 13. A portion of the light from source 1 is delivered by optical fiber bundle 14 directly to photodetector 15 without interaction with disk 3. Structure of a target surface of used multichannel fiber optic bundle in accordance to optical tracks and structure of a sensitive target surface of bundle 10 is shown in FIG. 2a, and FIG. 2b.

Figure 3:
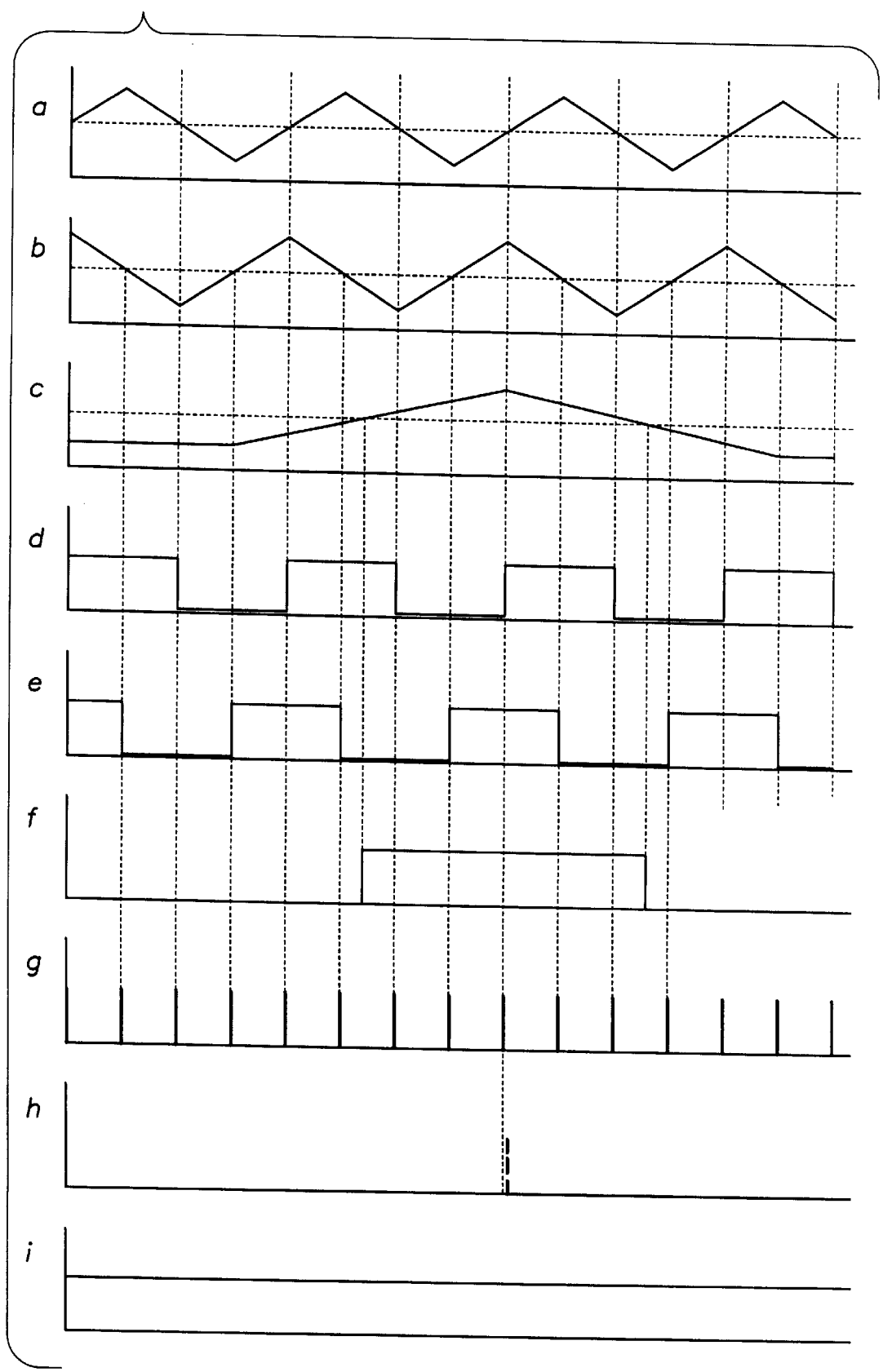
FIG. 3 is a diagram showing preferred embodiment signals for the situations detailed below, where the X-axis is a response to angular or linear displacement and Y axis values represent voltage values in different outputs of electronics components in accordance for versions of the embodiments given in FIGS. 1a and 1b.

The details of this can described, for example, by the following where fibers of in fiber bundle A are placed near first raster optical coding track 4 with step n*W/4, where n is an integer, two channels 6, 7 of multichannel fiber optic bundle (MFOB) B make it possible to create a phase difference between the two light signals in channels 6 and 7. These two signals, after conversion by light detectors 8, 9 into electrical signals, are shown in FIG. 3 lines a and b. Phase differences are calculated in quarter steps of W which make it possible to compare these signals with the feedback signal from photodetector 15 after passing through amplifier 19.

Photodetectors 8, 9, 13, and 15 are connected to inputs of comparators 16, 17, 18, 19 respectively. Outputs of amplifiers 16, 17, 18 are connected to inputs of comparators 20, 21 and 22. Output of amplifier 19 is connected to inputs of amplifiers 16, 17, 18 to control a base of the signal level. Outputs of comparators 20, 21, 22 are connected to digital block 23 generating electric pulses, whose number is proportional to the angular displacement of disk 3, to the pulse indicating zero position of disk 3, and to the signal indicating the direction of disk displacement.

Figure 1B:
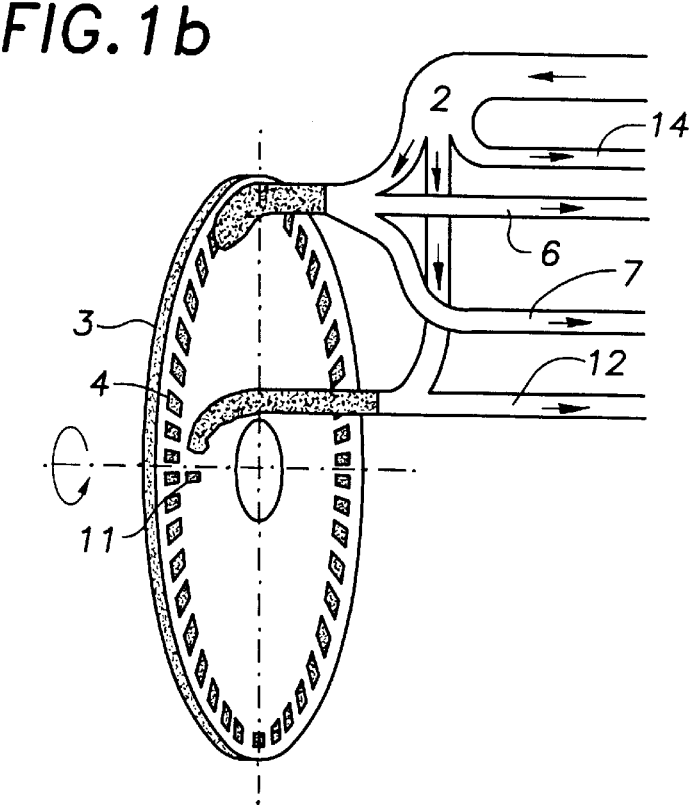
FIG. 1b shows basic optic elements of a fiber optic sensor constructed in accordance with another preferred embodiment of this invention, where the rotating disk has reflective and non-reflective sections.
Figure 1C:
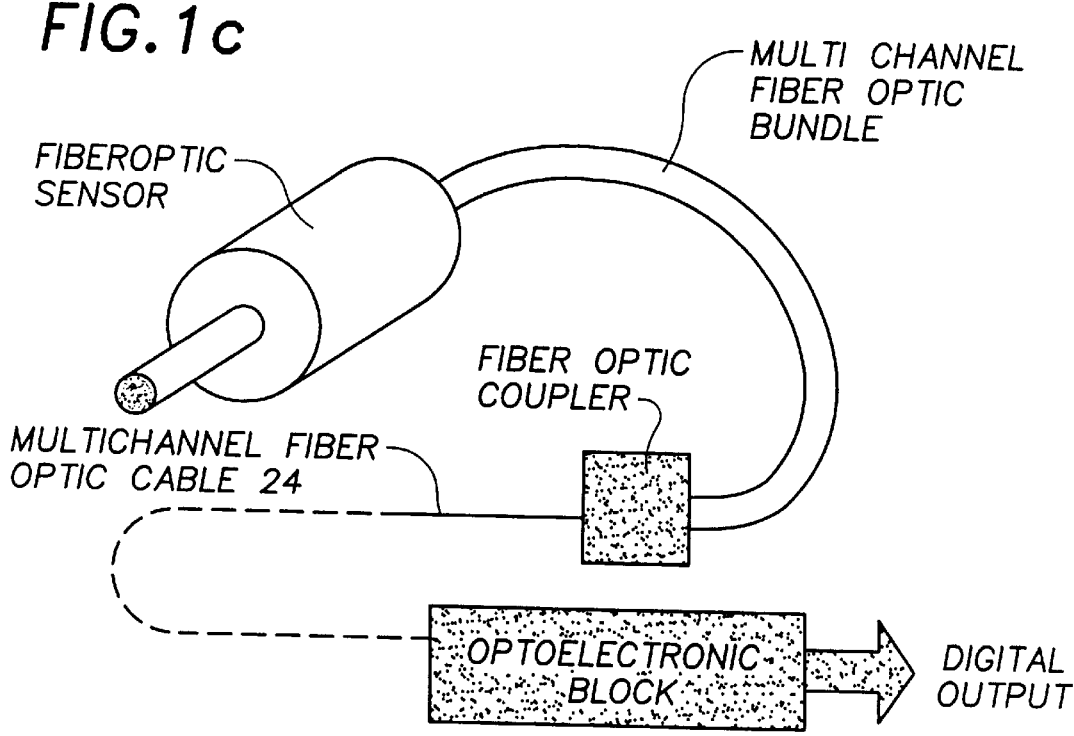
FIG. 1c shows a fiber optic angular sensor constructed in accordance with this invention.
Figure 1D:
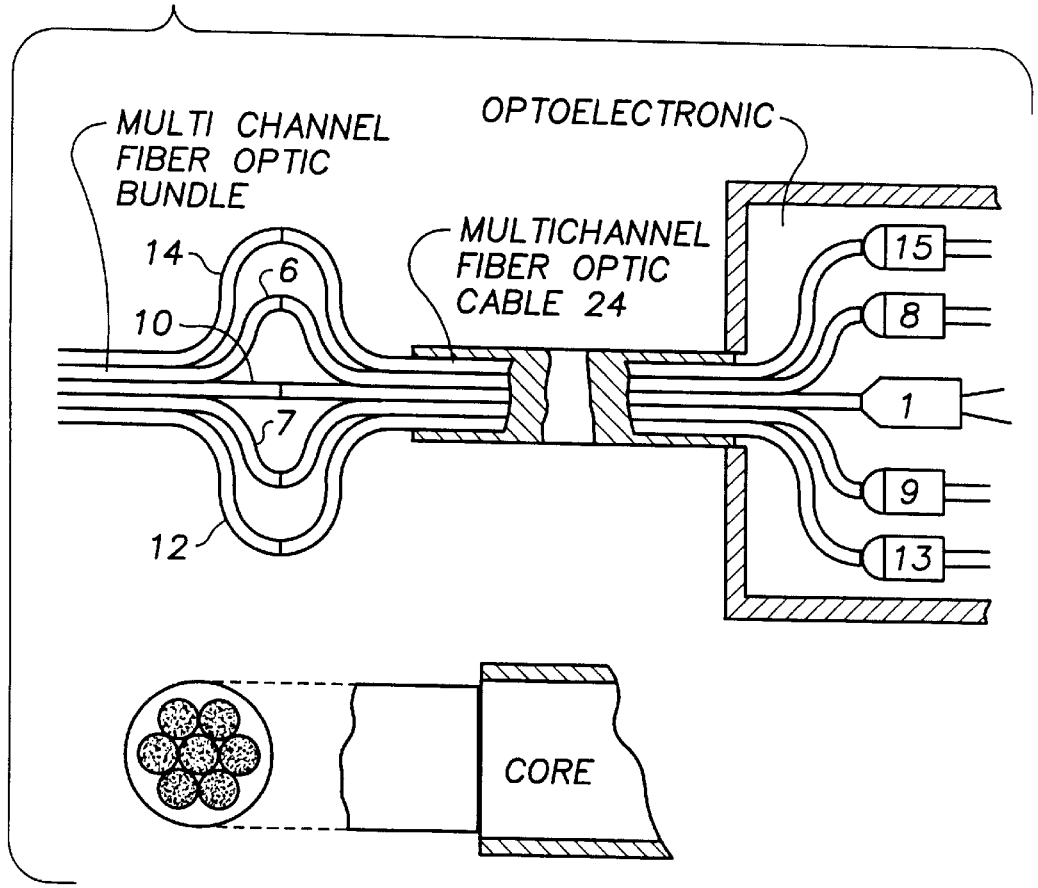
FIG. 1d illustrates the structure of coupler between a multichannel fiber optic bundle, an optical cable and photonic components of an electronic subsystem (block), such as photodiodes and LEDs.

When the distance between the fiber optic sensor and Optoelectronic Block (Subsystem) is more than 1–2 meters, Multichannel Fiber Optic Bundle B channels 6, 7 and fiber optic bundle (FOB) 12 can be connected with the Optoelectronic Subsystem by a Multimode Fiber Optic Cable 24 (see FIGS. 1c, d). Cable 24 is connected directly with ends of MFOB 6, 7 and the end of FOB 12 (see FIG. 1d).

Additional information is provided by the following details. Feedback channel 14 is placed snugly with channels 2, 10 of bundle A so that all variations in light intensity exist in all channels simultaneously. In normal case signal S1 (see in FIG. 4) and voltage Uo create signal Uc(S1) (after comparator 20, 21). If some environmental factors or other factors (for example if positions of flexible part of MFOB was changed) influence light intensity, signal S1 can change amplitude looking like S1c. If, for example, feedback channel 14 is cut from amplifier 15 input signal Uc(S1) without feedback control from amplifier 19 changes pulse width to Uc(S1c). This effect causes error w1 (see in FIG. 4 last diagram). If feedback control by amplifier 19 exist, voltage Uo is shifted to level Uo–Us and the pulse width is altered marginally (see difference between Uc(S1) and Uc(S1c) in second diagram of FIG. 4).

Channel 10 of MFOB A illuminates a fiber optic bundle 12, through a second optical track on the sensitive target surface as shown in FIG. 2b. When a zero pulse with width Q crosses a light path from channel 10 to channel 12, a photodetector 13 receives from second optical track 11 a zero modulated light and converts this signal into electrical signal (see FIG. 3 line c), where width of half pulse depends of width Q. Comparators 20, 21, 22 supply a logic indication of agreement or disagreement and match two quantities (see FIG. 3 lines d, e, f) of two main signals (shifted in phase W/4; see FIG. 3 line a and b) and zero signal pulse (see in FIG. 3 line c). A digital electronic block as commonly used for angle displacement sensors creates from the three signals presented in FIG. 3 lines d, e, f: a plurality of counting pulses as a first output; a zero pulse as a second output; and a signal of rotational direction as a third output (see in FIG. 3 lines g, h, i). Signal I is shown as one level "1" because all diagrams in FIG. 3 are shown for movement in one direction only. If direction of movement changed to alternative signal I will be "0".

Figure 2C:
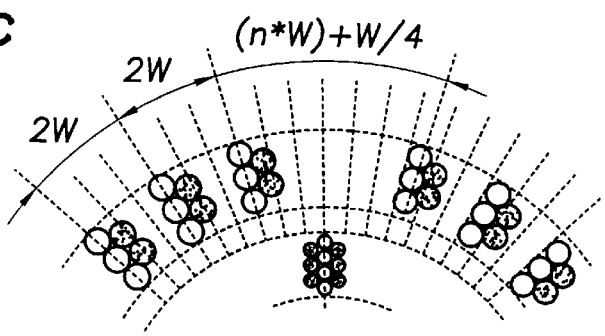
FIG. 2c shows a structure of a sensitive target surface of multichannel fiber optic bundle (MFOB) in accordance with the embodiment in FIG. 1b.

A second preferred embodiment of invention is described for the case when an optical code wheel has reflective and non-reflective sections. Here a reflective type of Multichannel Fiber Optic Bundle (see FIG. 1b and FIG. 2c) is used. A light from channels 2 in this case is reflected from raster (FIG. 2a) and received by receiving channels 6, 7, and 12. According to this second embodiment a sensitive target surface of MFOB consist from receiving and transmitting channels (labeled dark in FIG. 2c). Two main channels 6 and 7 consisting of a plurality of receiving and transmitting fibers have [(n*W+W/4] phase shift between them, which creates two basic signals (see FIG. 3 lines a and b). Structure of fiber optic sensitive target of channel 12 can be different and depend from fiber diameter $D_2$ and zero section width Q. When the total width of fiber section of channel 12 is smaller than W, channel 12 can be designed from fiber with same diameter ($D_1=D_2$), because receiving fiber are surrounded by transmitting fibers (Labeled dark in FIG. 2c). All other components in second embodiment are designed like in the first embodiment described earlier.

Figure 2D:
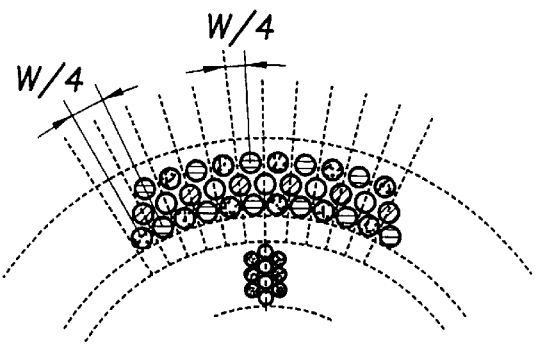
FIG. 2d shows a structure of a multipurpose sensitive target surface of a multichannel fiber optic bundle (MFOB) in accordance with either embodiment.

Third preferred embodiment, having a Multichannel Fiber Optic Bundle (see FIG. 2d) presents a design universal for both previous types of sensors (i.e. first or second embodiments). In this case fiber diameter is limited D<W/4 and fibers are snugly arranged structure of common end of MFOB. The total number of lines of fibers, K, is limited by height of raster section H: where H: (K*0,86*D), where K is an integer. FIG. 2d shows a bundle structure with K=3.

Four channels in MFOB allow design four main signal shifted in phase to 0, W/4, W/2, 3W/4. Two of these signals with phase difference W/4 or 3W/4 can be used for main signals and the other two signals can be used for more precision circuit or for preservation/synchronization tasks in a digital block 23.

Figure 1E:
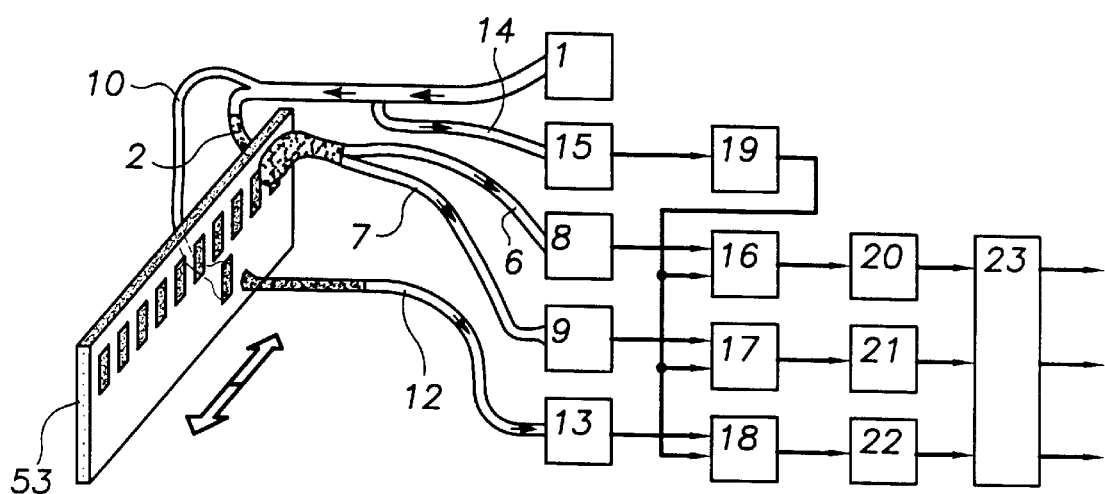
FIG. 1e shows basic elements of a fiber optic sensor constructed in accordance with a preferred embodiment of this invention for linear displacements, where a linear coding raster is placed between a light source and a multichannel fiber bundle.
Figure 2E:
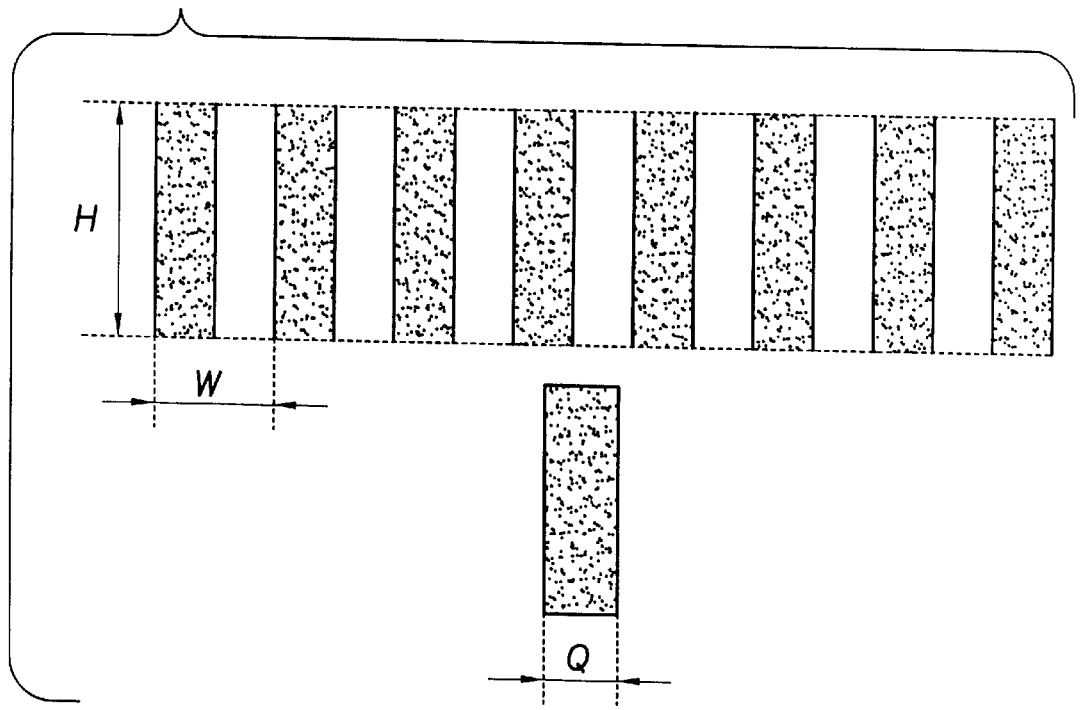
FIG. 2e shows a fragment of an optical tracks section in the linear raster.
Figure 2F:
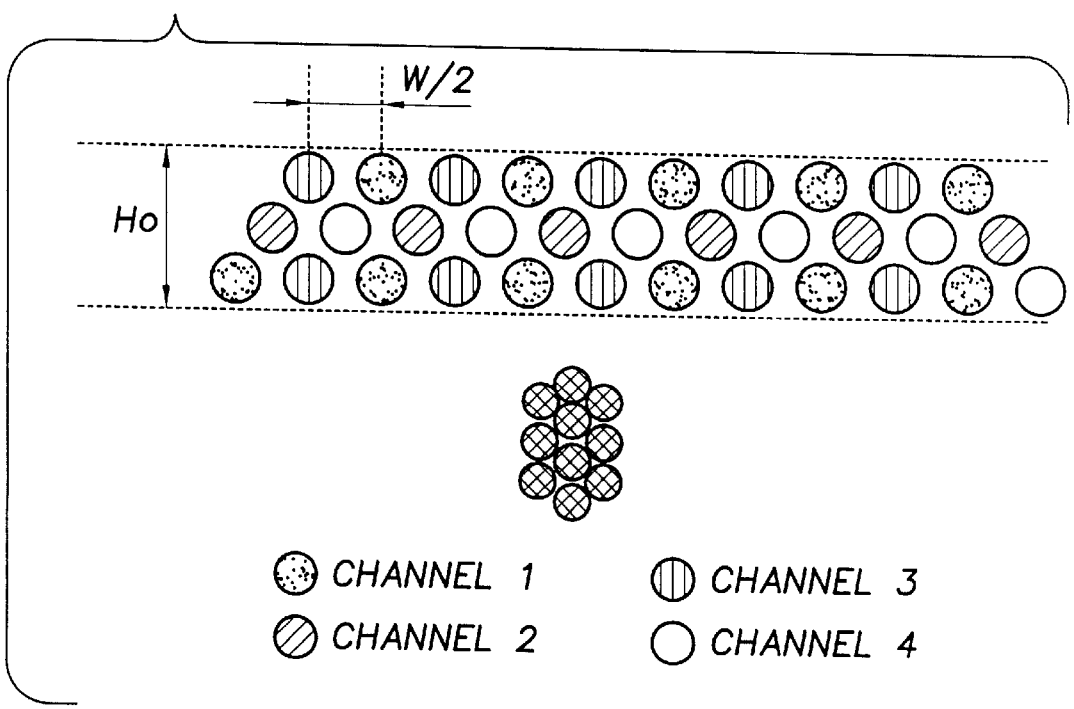
FIG. 2f shows a linear structure of a multipurpose sensitive target surface of multichannel fiber optic bundle (MFOB) in accordance with the embodiment in FIG. 1e.

Another preferred embodiment of the present invention is depicted in FIG. 1e and with reference to FIGS. 2e and f Here a linear displacement is to be measured. Again there are two optical tracks, one to monitor the zero position, using transmission channel 10 and receiving channel 12 and the other to measure the displacement using transmission channel 2 and receiving channels 6 and 7. The operation of the linear displacement sensor is quite equivalent to that for measuring angular displacement, except for using linear raster 53 in place of disk 3 of FIG. 1a or b. FIGS. 2e and 2f correspond to FIGS. 2a and 2d for the angular sensor. All components in FIG. 1e which have the same identifying numbers as in FIG. 1a have the same function for the linear displacement sensor as they do in the angular sensor.

The optical fiber bundles in the devices described above can be made sufficiently long to remove all electronic components and the power supply far away from sensing part of the device. This reduces the electrical noise and increases the high performance of the system. In particular, there is no longer a necessity to connect the sensitive part of the sensor to ground, a valuable advantage for some specific applications, such as operation of the displacement sensor under explosive conditions.

Having described preferred embodiments of the invention with reference to the accompanying drawings, it is to be understood that the invention is not limited to the precise embodiments, and that various changes and modifications may be effected therein by skilled in the art without departing from the scope or spirit of the invention as defined in the appended claims.

What is claimed:

1. A fiber optic displacement sensor for indicating the angle displacement and the rotational movement of a shaft or linear displacement of an object, comprising:

a first multichannel fiber optic bundle (MFOB A) for light transmission, which is split at one end into at least two channels, with at least one Reference Fiber Optic Channel for monitoring light intensity level of a light source;

two optical tracks for light modulation, a first optical track having means for displacement modulation, and a second optical track having at least one section for detecting a reference position;

a second multichannel fiber optic bundle (MFOB B) for receiving modulated light having at least two channels to split said received light and to introduce a phase difference of about 90 degrees between said light in said at least two channels;

light detectors for receiving a modulated light and converting it into an electrical signal, said light detectors being connected to individual ends of said at least two channels of said second multichannel fiber optic bundle; and wherein said second Multichannel Fiber Optic Bundle for receiving modulated light further comprises groups of optical fibers within each of said at least two channels, said fibers each having a fiber core with a diameter, $D_1$, such that $D_1<W/2$, where W is a period of modulation of said first type of optical track; fiber core centers of said fibers are placed with spacing $L_1=m(W/4)$, m taking on integer values; within one group (row) of fibers, fiber core centers of said fibers are placed within a light path of said optical track and have spacing between centers $L_2=n(W/2)$, n taking on integer values independently of m; and distance $L_3$ between centers of said fibers included in different groups (rows) being given by $L_3=m(W/4)$.

2. A fiber optic displacement sensor according to claim 1, wherein said means for displacement modulation involves having alternating transmissive and non-transmissive sections on a raster illuminated by channels.

3. A fiber optic displacement sensor according to claim 1, wherein said means for displacement modulation involves having alternating reflective and non-reflective sections; said first and second Multichannel Fiber Optic Bundles are joined in the receiving ends and light transmitting and light receiving make a reflective type of modulated light path; fiber core centers of said fibers are spaced with step $L_4=m (W/4)$; and receiving fibers are interlaced with transmitting fiber(s) at an end facing said optical tracks and all fibers are designed to snugly fit in a row or rows of said bundle.

4. A fiber optic displacement sensor according to claim 1, wherein each group of fibers bundled in one channel of said receiving bundle is connected with one single fiber, such that an opposite end of each said single fiber is connected with a light detector; and said single fiber core has a diameter large enough to collect a majority of light which come from fibers within said attached channel of said bundle.

5. A fiber optic displacement sensor according to claim 2, wherein each group of fibers bundled in one channel of said receiving bundle is connected with one single fiber, such that an opposite end of each said single fiber is connected with a light detector; and said single fiber core has a diameter large enough to collect a majority of light which come from fibers within said attached channel of said bundle.

6. A fiber optic displacement sensor according to claim 3, wherein each group of fibers bundled in one channel of said receiving bundle is connected with one single fiber, such that an opposite end of each said single fiber is connected with a light detector; and said single fiber core has a diameter large enough to collect a majority of light which come from fibers within said attached channel of said bundle.

7. A fiber optic displacement sensor according to claim 1, wherein each group of fibers bundled in one channel of said transmitting bundle is connected with one single fiber, such that an opposite end of each said single fiber is connected with a light source; and said single fiber core has a diameter large enough to transmit a majority of light from said source to said fibers within said attached channel of said bundle.

8. A fiber optic displacement sensor according to claim 2, wherein each group of fibers bundled in one channel of said transmitting bundle is connected with one single fiber, such that an opposite end of each said single fiber is connected with a light source; and said single fiber core has a diameter large enough to transmit a majority of light from said source to said fibers within said attached channel of said bundle.

9. A fiber optic displacement sensor according to claim 3, wherein each group of fibers bundled in one channel of said transmitting bundle is connected with one single fiber, such that an opposite end of each said single fiber is connected with a light source; and said single fiber core has a diameter large enough to transmit a majority of light from said source to said fibers within said attached channel of bundle.

* * * * *